Patented May 4, 1926.

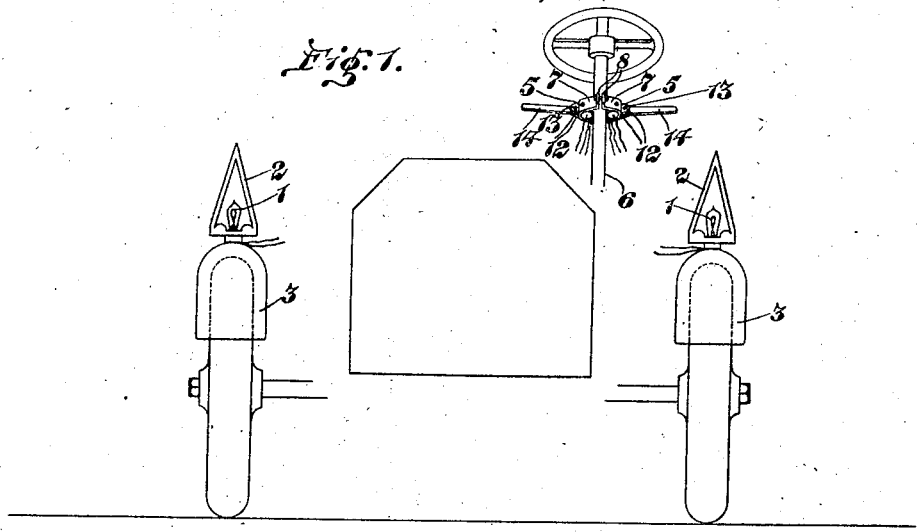
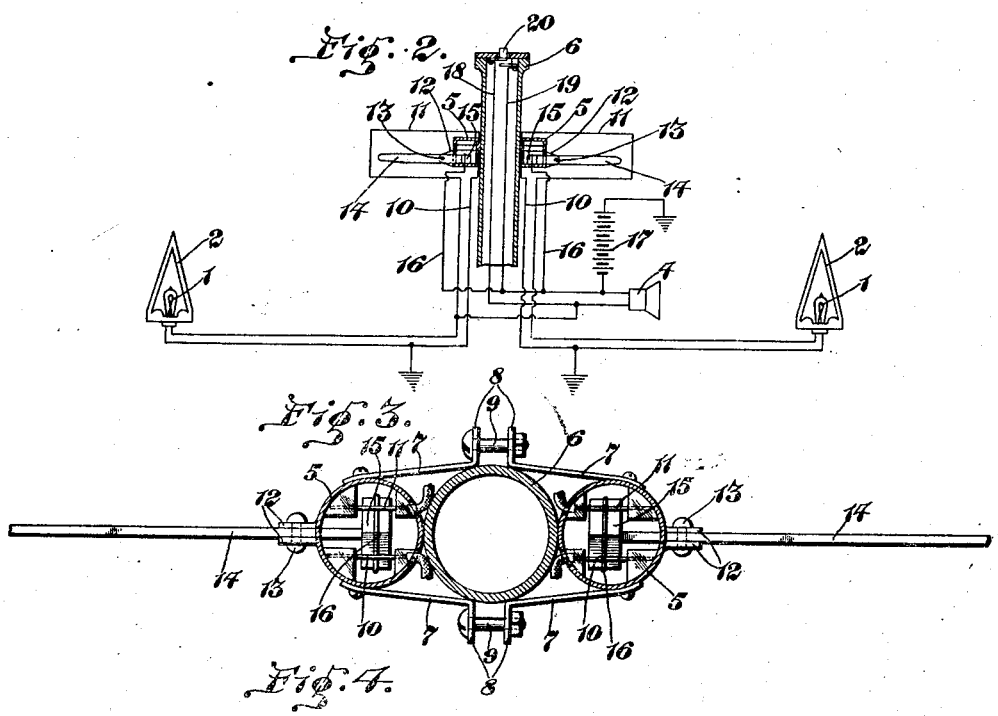

1,583,113

UNITED STATES PATENT OFFICE.

CHARLES E. BETZLER, OF ST. LOUIS, MISSOURI.

CIRCUIT CLOSER.

Application filed August 19, 1919. Serial No. 318,570.

*To all whom it may concern:*

Be it known that I, CHARLES E. BETZLER, a citizen of the United States, residing at the city of St. Louis and State of Missouri, have invented a new and useful Circuit Closer, of which the following is a specification.

This invention relates to improvements in circuit closers for vehicle signals, and consists in the novel construction hereinafter described.

An object of the invention is to provide in a vehicle signal, a novel form of circuit closer, which may be conveniently mounted adjacent to the steering wheel of the vehicle, and which may be readily operated by the driver of the vehicle, to indicate either the change of direction or the intention to start or stop the vehicle.

With the foregoing, as well as additional advantages and features in view, I have designed the construction hereinafter disclosed, reference being made to the accompanying drawing, in which—

Fig. 1 is an outline front elevation of a vehicle embodying the invention.

Fig. 2 is a diagrammatic view illustrating the signals and the electrical connections therewith.

Fig. 3 is a cross-section through the steering column of the vehicle, and through the circuit closer cases, illustrating the construction of the circuit closers, and the method of attachment to the steering column.

Fig. 4 is a transverse vertical section through the circuit closer.

In the embodiment of the invention illustrated in the drawing, the visible signals comprise electrical lamps 1, arranged in any desired form of cases 2, and disposed preferably in a vertical position on the front fenders 3, of the motor vehicle. The cases 2, for the lamps are preferably provided with front and rear windows, so that they may be observed either from the front or rear of the vehicle. An audible signal, preferably in the form of a horn, is mounted at a suitable place on the vehicle. The lamps on either side of the vehicle are arranged in separate electrical circuits, both of which circuits are arranged in circuit with the audible signal, so that if it is desired to indicate change of direction, the lamp on the side towards which the vehicle is about to turn, may be energized, and at the same time the audible signal sounded.

The horn may be also operated through a separate circuit controlled by an independent circuit closer, so that it may be sounded without operating the visible signals.

The circuit closers for controlling the circuits for the visible and audible signals are of novel construction, and comprise a cylindrical case 5, the case being so designed that one case may be strapped on either side of the steering column of the vehicle steering column 6.

A suitable form of a device for connecting the cases of the circuit breakers to the steering column includes metallic straps 7, secured at one end to the cases, said straps having oppositely disposed ears 8, the straps being drawn together by adjustable bolts 9, extending through openings in the ears 8.

Within each of the cases 5, and secured in parallel arrangement are the ends of leads 10 and 11. Projecting outwardly from the side of the case 5, are spaced ears 12, through which a bolt 13, extends. The bolt 13, constitutes a pivot for a lever 14, which extends outwardly for a considerable distance beyond the case 5.

The short arm of the lever 14, extends through a vertical slot in the side wall of the case 5, and carries a block 15 at its inner end, the top wall of which is triangular in form. The apex of the triangle extends intermediate of the leads 10 and 11.

The end of a lead 16 is secured over the top of the block 15, and extends outwardly through the bottom of the case. The lever 14, has excess weight at its inner end, so that the lead 16 is normally out of contact with the leads 10 and 11.

In order to operate the circuit closer, it is only necessary to exert slight pressure on the outer arm of the lever 14, thereby raising the inner end and bringing the lead 16 into contact with the leads 10 and 11. As soon as pressure is released on the lever, the contact is broken, the inner end of the lever 14 being depressed by gravity.

The leads 10 and 11, and the lead 16 controlled by the circuit closer on one side, constitute a complete circuit for the lamp on that side, and the audible signal; and the circuit closer on the other side, together with the leads 10 and 11 and the lead 16 constitute a separately controllable circuit for the lamp on that side, and the audible signal. Both circuits are energized by a battery 17.

A separate circuit comprising leads 18 and 19 leading to the audible signal, and operated by a push button 20, may be provided for operating the audible signal independently of the visible signals.

I am aware that the construction may be modified in certain particulars, without departure from the spirit and scope of the invention. I do not limit myself, therefore, to the exact construction herein described, but what I claim and desire by Letters Patent is:

1. In a vehicle signal, a circuit closer comprising a case adapted to be attached to the steering column of a vehicle, a lever pivoted to and having one end extending into the case and the other end extending beyond the case, said lever being balanced to normally depress the end within the case, a block carried by the inner end of said lever within the case and having an angular upper face, a pair of circuit wires extending into the case and arranged above the angular face of said block, and an additional wire supported along the inclined sides of said block, said wire being normally held out of contact with said first named wires by the weight of the arm of the lever within the case and being arranged to engage therewith by pressure on the outer end of said lever.

2. In a vehicle signal, a circuit closer for closing a plurality of circuits at one operation, comprising a case adapted to be attached to the steering column of a vehicle, a pair of parallel circuit wires extending into the case, a weighted lever having one end extending into the case below said circuit wires and one end extending exteriorly of the case for manual engagement, said lever being weighted to normally hold the inner end of the lever depressed, and a wire carried by the inner end of the lever arranged to contact with said circuit wires by pressure on the outer end of said lever.

CHARLES E. BETZLER.